(12) United States Patent
Singh et al.

(10) Patent No.: US 10,922,022 B2
(45) Date of Patent: Feb. 16, 2021

(54) METHOD AND SYSTEM FOR MANAGING LBA OVERLAP CHECKING IN NVME BASED SSDS

(71) Applicant: SAMSUNG ELECTRONICS CO., LTD., Suwon-si (KR)

(72) Inventors: Abhinav Kumar Singh, Bihar (IN); Vikram Singh, Bangalore (IN); Chandrashekar Tandavapura Jagadish, Karnataka (IN); Ajith Mohan, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/416,668

(22) Filed: May 20, 2019

(65) Prior Publication Data
US 2020/0293226 A1    Sep. 17, 2020

(30) Foreign Application Priority Data
Mar. 13, 2019    (IN) .............................. 201941009763

(51) Int. Cl.
*G06F 3/06* (2006.01)

(52) U.S. Cl.
CPC .......... *G06F 3/0659* (2013.01); *G06F 3/0604* (2013.01); *G06F 3/0658* (2013.01); *G06F 3/0679* (2013.01)

(58) Field of Classification Search
CPC ...... G06F 3/061; G06F 3/0656; G06F 3/0679; G06F 12/10; G06F 12/0238; G06F 3/0659

USPC ......................................................... 711/154
See application file for complete search history.

(56) References Cited

U.S. PATENT DOCUMENTS

| 8,352,689 | B2 | 1/2013 | Noeldner et al. | |
|---|---|---|---|---|
| 2015/0253992 | A1* | 9/2015 | Ishiguro | G06F 3/0679 711/103 |
| 2016/0110296 | A1* | 4/2016 | Bao | G06F 12/1483 711/102 |
| 2018/0357170 | A1* | 12/2018 | Benisty | G06F 12/0868 |
| 2020/0057582 | A1* | 2/2020 | Shin | G06F 3/0679 |
| 2020/0133833 | A1* | 4/2020 | Hughes | G06F 12/0246 |

\* cited by examiner

*Primary Examiner* — Than Nguyen
(74) *Attorney, Agent, or Firm* — F. Chau & Associate, LLC

(57) ABSTRACT

A method for managing Logical Block Address (LBA) range overlap checking in a Non-Volatile Memory express (NVMe) based Solid State Drive (SSD) includes detecting, by an LBA-Overlap Check (LOC) module, an overlap between an LBA range of an incoming command with an LBA range of at least one outstanding command in an SSD controller, determining, by the LOC module, an overlap count value corresponding to the incoming command, where the overlap count value indicates occurrence of an overlap between the LBA range of the incoming command and the LBA range of the at least one outstanding command, and executing, by the SSD controller, the incoming command based on the overlap count value corresponding to the incoming command.

9 Claims, 8 Drawing Sheets

LOC Table

| Index | Command | LBA Range | Overlap Count |
|---|---|---|---|
| 0 | TAG 0 | 0-10 | 0 |
| 1 | TAG 1 | 25-30 | 0 |
| 2 | TAG 2 | 5-9 | 1 |
| 3 | TAG 3 | 7-26 | 3 |
| . | . | | |
| . | . | | |
| . | . | | |
| 255 | . | | |

Completion

LOC Table

| Index | Command | LBA Range | Overlap Count |
|---|---|---|---|
| 0 | TAG 0 | 0-10 | 0 |
| 1 | TAG 1 | 25-30 | 0 |
| 2 | TAG 2 | 5-9 | 0 |
| 3 | TAG 3 | 7-26 | 2 |
| . | . | | |
| . | . | | |
| . | . | | |
| 255 | . | | |

Completion

| |
|---|
| TAG 0 |
| |
| |
| |

FIG. 4b

LOC Table

| Index | Command | LBA Range | Overlap Count |
|---|---|---|---|
| 0 | TAG 0 | 0-10 | 0 |
| 1 | TAG 1 | 25-30 | 0 |
| 2 | TAG 2 | 5-9 | 0 |
| 3 | TAG 3 | 7-26 | 1 |
| . | . | | |
| . | . | | |
| . | . | | |
| 255 | . | | |

Completion

| |
|---|
| TAG 0 |
| TAG 1 |
| |
| |

FIG. 4c

LOC Table

| Index | Command | LBA Range | Overlap Count |
|---|---|---|---|
| 0 | TAG 0 | 0-10 | 0 |
| 1 | TAG 1 | 25-30 | 0 |
| 2 | TAG 2 | 5-9 | 0 |
| 3 | TAG 3 | 7-26 | 0 |
| . | . | | |
| . | . | | |
| . | . | | |
| 255 | . | | |

Completion

| |
|---|
| TAG 0 |
| TAG 1 |
| TAG 2 |
| |

FIG. 4d

METHOD AND SYSTEM FOR MANAGING LBA OVERLAP CHECKING IN NVME BASED SSDS

CROSS-REFERENCE TO RELATED APPLICATION

The present application claims priority under 35 U.S.C. § 119 to Indian Patent Application No. 201941009763, filed on Mar. 13, 2019, the disclosure of which is incorporated by reference herein in its entirety.

TECHNICAL FIELD

Exemplary embodiments of the inventive concept herein relate to Non-Volatile Memory express (NVMe) based Solid State Drives (SSDs), and more particularly, to methods and systems for managing Logical Block Address (LBA) overlap checking in bare metal multi-core Peripheral Component Interconnect express (PCIe) based NVMe SSDs that supports multipath Input/Output (I/O).

DISCUSSION OF RELATED ART

An entity, which is able to interact with a controller by sending commands as per the NVMe specification, may be termed as a host. NVM Host Controller Interface (NVMHCI) specification is a logical device interface specification for accessing non-volatile storage media attached through a PCIe bus. An NVMe based SSD includes a host controller, which includes a plurality of cores. The host controller in the SSD may perform functions such as command validation, command execution, LBA overlap occurrence management, data transfer with the host, and so on. The controller may enable efficient utilization of flash memory in the SSD. The plurality of cores may allow simultaneous or parallel execution of a plurality of commands, which requires access to logical blocks in the flash memory of the SSD. The host controller may identify and/or access logical blocks based on a Starting Logical Block Address (SLBA) and a Number of Logical Blocks (NLB) specified in a command.

Consider a scenario where a plurality of commands, processed by the same or different cores of a controller, attempt to access the same logical blocks of the same namespace, e.g., the LBA range of a command overlaps with the LBA range of another command from the same namespace. This scenario may be referred to as occurrence of LBA overlap, where commands with overlapping LBA ranges are outstanding in the controller for completion. On detection of an LBA overlap scenario, execution of other commands may be blocked.

The other commands may arrive at the controller subsequent to the plurality of commands, and may attempt to access different logical blocks of the flash memory. The logical blocks being accessed by the subsequent commands may be different from the logical blocks, which are being accessed by the commands whose LBA ranges are overlapping with each other.

The execution of the subsequent commands after the detection of LBA overlapping may be blocked to ensure integrity of data in the flash memory of the SSD, prevent data corruption, occurrence of error, and so on. This may lead to an increase in latency of execution of the subsequent commands. In a worst-case scenario, the LBA overlap may lead to execution timeout for the subsequent commands.

FIG. 1 depicts an interface between a host and a controller. The controller may be associated with a single PCIe function that may process commands and may send an appropriate response to the host as per the NVMe specification.

FIG. 2 depicts an SSD with a single controller. The SSD may have a single controller, if the SSD does not support Single Root Input/Output Virtualization (SRIOV) capabilities or multipath capabilities using physical ports.

FIG. 3 depicts a host device interface supporting SRIOV. A PCIe based SSD may have multiple controllers, if the SSD supports multipath IO and SRIOV capabilities. The PCIe based SSD that supports SRIOV may support multiple functions. The PCIe based SSD may have one physical function and four virtual functions. An NVMe controller is associated with each virtual function, and each NVMe controller may have a private namespace (e.g., NS A to NS B) and access to a namespace shared by all controllers (e.g., NS E).

SUMMARY

According to an exemplary embodiment of the inventive concept, a method for managing Logical Block Address (LBA) range overlap checking in a Non-Volatile Memory express (NVMe) based Solid State Drive (SSD) may include detecting, by an LBA-Overlap Check (LOC) module, an overlap between an LBA range of an incoming command with an LBA range of at least one outstanding command in an SSD controller, determining, by the LOC module, an overlap count value corresponding to the incoming command, wherein the overlap count value indicates occurrence of an overlap between the LBA range of the incoming command and the LBA range of the at least one outstanding command, and executing, by the SSD controller, the incoming command based on the overlap count value corresponding to the incoming command.

According to an exemplary embodiment of the inventive concept, in a Non-Volatile Memory express (NVMe) based Solid State Drive (SSD) capable of managing Logical Block Address (LBA) range overlap checking, the NVMe based SSD is configured to detect, by an LBA-Overlap Check (LOC) module, an overlap between an LBA range of an incoming command with an LBA range of at least one outstanding command in an SSD controller, determine, by the LOC module, an overlap count value corresponding to the incoming command, wherein the overlap count value indicates occurrence of an overlap between the LBA range of the incoming command and the LBA range of the at least one outstanding command; and execute, by the SSD controller, the incoming command based on the overlap count value corresponding to the incoming command.

BRIEF DESCRIPTION OF THE DRAWINGS

The above and other features of the inventive concept will become more apparent by describing in detail exemplary embodiments thereof with reference to the accompanying drawings.

FIGS. 4a-4d depict stages for handling overlap between Logical Block Address (LBA) ranges of a plurality of commands, according to an exemplary embodiment of the inventive concept.

DETAILED DESCRIPTION OF THE EMBODIMENTS

Figure 1:
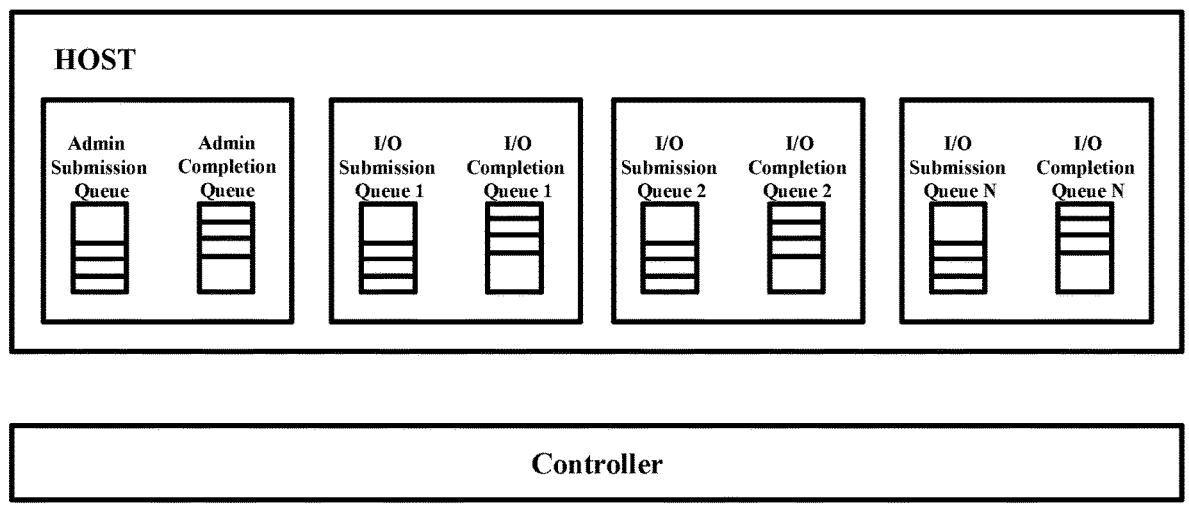
FIG. 1 depicts an interface between a host and a Non-Volatile Memory express (NVMe) controller.
Figure 2:
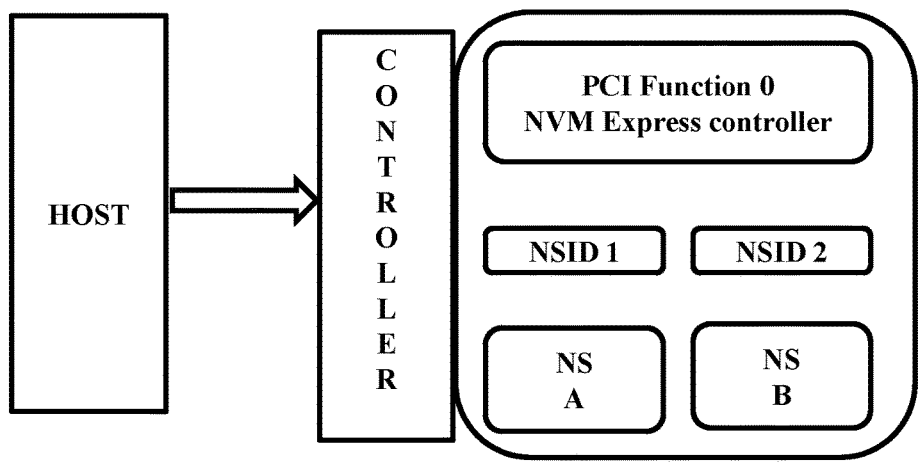
FIG. 2 depicts a Solid State Drive (SSD) with a single controller.
Figure 3:
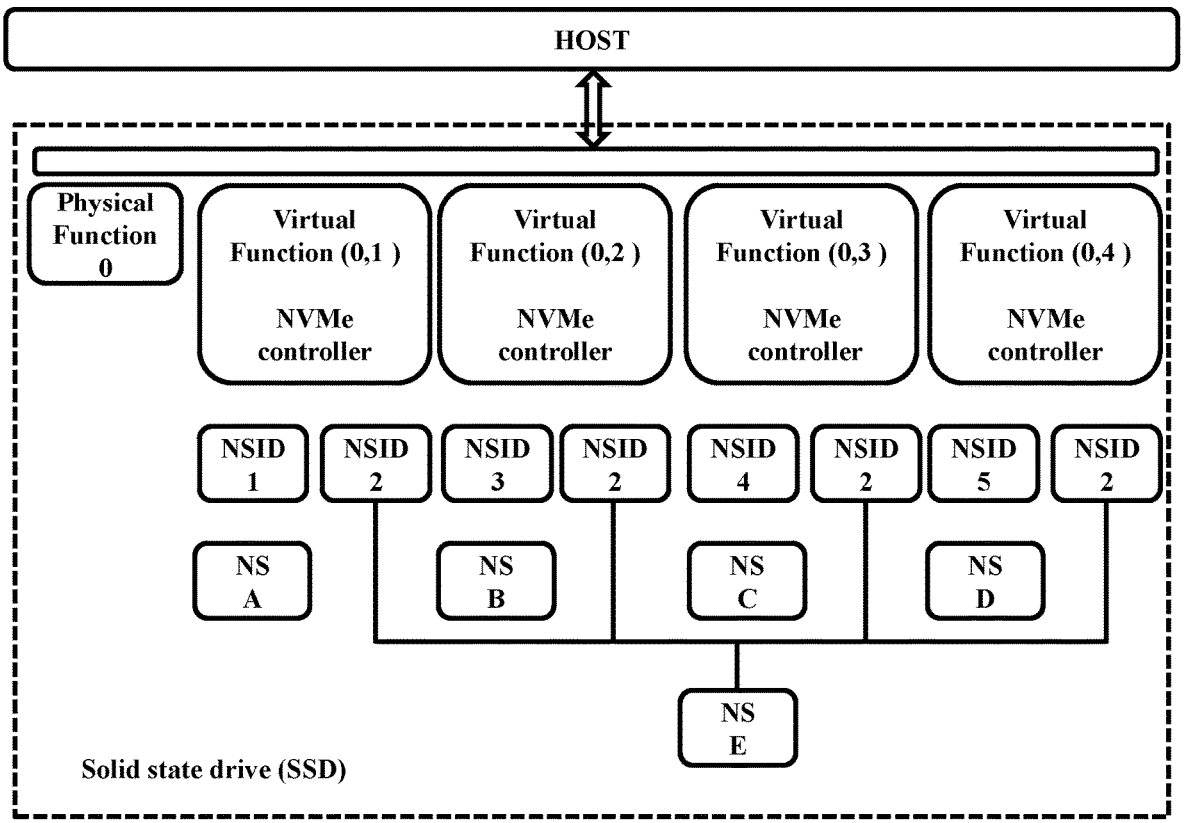
FIG. 3 depicts a host device interface supporting Single Root Input/Output Virtualization (SRIOV).

Exemplary embodiments of the inventive concept provide methods and systems for managing Logical Block Address (LBA) overlap checking in a bare metal multi-core Peripheral Component Interconnect Express (PCIe) based Non-Volatile Memory express (NVMe) Solid State Drive (SSD) that supports multipath input/output (I/O).

Exemplary embodiments of the inventive concept enable sequential execution of commands that are performing operations on the same logical blocks, and seamless execution of commands that are performing operations on different logical blocks.

An overlap between an LBA range of an incoming command and an LBA range of at least one command that is outstanding, in a controller of an SSD, for completion may be detected. The at least one command that is outstanding in the controller may arrive prior to the incoming command. The at least one command that is outstanding in the controller may be referred to as the at least one outstanding command.

An overlap count, which may indicate occurrence or absence of overlapping between the LBA range of the incoming command and the LBA range of the at least one outstanding command which is pending in controller for completion, may be maintained. For example, an overlap count corresponding to each of Read, Write, and compare commands, which are submitted to the controller, may be maintained.

The overlap count may be set when the incoming command arrives at the controller of the SSD. The overlap count may be computed or updated for each command when the command arrives in the controller.

The overlap count may be decremented when the at least one outstanding command is completely processed and a response is posted from the controller.

Completion of a command may indicate or mean that the command has been processed.

The incoming command may be executed when the overlap count is zero. An overlap count may be kept for all commands whose LBA ranges overlap with the LBA ranges of other commands which are relatively outstanding in the controller. These commands may be executed when their respective overlap count is zero. Thus, the commands with LBA ranges overlapping with the LBA ranges of the outstanding commands may be executed in a sequential manner. On the other hand, commands, with LBA ranges not overlapping with the LBA ranges of the outstanding commands, may be executed in parallel.

Exemplary embodiments of the inventive concept will be described more fully hereinafter with reference to the accompanying drawings. Like reference numerals may refer to like elements throughout this application.

FIGS. 4a-4d depict stages for handling overlap between LBA ranges of a plurality of commands, according to an exemplary embodiment of the inventive concept.

An incoming command arriving in a controller of an SSD may attempt to perform at least one operation, such as Read, Write, and so on. The at least one operation may be performed on the logical blocks of the device. The logical blocks may be specified by an LBA range. The LBA range may be a parameter associated with the command. When the LBA range of the command overlaps with a LBA range of another command in the controller, an LBA overlap scenario is detected.

Figure 4A:
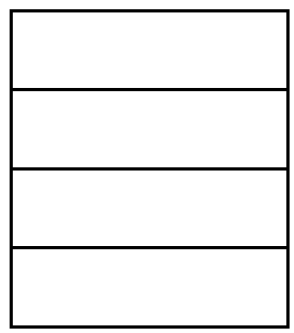

As depicted in FIG. 4a, the order of arrival of commands in the controller is Tag 0, Tag 1, Tag 2, and Tag 3. Each command arriving in the controller may be associated with a Tag. The commands may be associated with respective LBA ranges, which specify the logical blocks of the namespace wherein the commands will be performing operations.

The respective LBA ranges of the commands associated with Tag 0, Tag 1, Tag 2, and Tag 3 are 0-10, 25-30, 5-9, and 7-26. As the LBA range of the command associated with Tag 0 and the LBA range of the command associated with Tag 1 do not overlap, the overlap count of Tag 0 and Tag 1 is 0. In other words, as the command associated with Tag 0 is the first to arrive, the overlap count of Tag 0 will be 0. As the LBA range of the command associated with Tag 1 does not overlap with the LBA range of the command associated with Tag 0, the overlap count of Tag 1 is 0.

The LBA range of the command associated with Tag 2 is 5-9 and the LBA range of the command associated with Tag 0 is 0-10. Therefore, there is an occurrence of an LBA overlap scenario. As the command associated with Tag 0 arrives earlier than the command associated with Tag 2 and the LBA range of the command associated with Tag 2 overlaps with the LBA range of the command associated with Tag 0, the overlap count of Tag 2 is 1.

The LBA range command associated with Tag 3 is 7-26. The LBA range of the commands associated with Tag 0, Tag 1, and Tag 2 are 0-10, 25-30, and 5-9, respectively. Thus, there is an occurrence of an LBA overlap scenario. The LBA range of the command associated with Tag 3 overlaps with the LBA ranges of the commands associated with Tag 0, Tag 1, and Tag 2. As the commands associated with Tag 0, Tag 1, and Tag 2, arrive earlier than the command associated with Tag 3, and the LBA range of the command associated with Tag 3 overlaps with the LBA ranges of the commands associated with Tag 0, Tag 1, and Tag 2, the overlap count of Tag 3 is 3.

The completion table is used for indicating the commands which have been completely processed from the controller side. Initially, as none of the commands are completed from the controller side, the completion table is empty. When the overlap count of a Tag, associated with a command, is 0, then this command may proceed to further processing stages of execution. It is assumed here that the command associated with Tag 0 is executed first, followed by the command associated with Tag 1.

In an exemplary embodiment of the inventive concept, if the commands associated with Tag 0 and Tag 1 arrive at substantially the same time, then the commands may be executed in parallel.

As depicted in FIG. 4b, as the command associated with Tag 0 is completed, the overlap counts of Tag 2 and Tag 3 are each decremented by 1. The overlap count of Tag 2 is 0 and the overlap count of Tag 3 is 2. This is because, the overlap between the LBA range of the command associated with Tag 2 and the LBA range of the command associated with Tag 0 no longer occurs. The overlap between the LBA range of the command associated with Tag 3 and the LBA range of the command associated with Tag 0 also no longer occurs. The LBA range of the command associated with Tag 3 still overlaps with the LBA ranges of the commands associated with Tag 1 and Tag 2. When the command associated with Tag 0 is completely processed, the first entry of the completion table is filled with the command associated with Tag 0. The command associated with Tag 2 may now be executed.

In an exemplary embodiment of the inventive concept, the commands associated with Tag 1 and Tag 2 at this stage may be executed in parallel, as the overlap count for both commands Tag 1 and Tag 2 is 0.

As depicted in FIG. 4c, as the command associated with Tag 1 is completely processed, the overlap count of Tag 3 is decremented further by 1. The overlap count of Tag 3 is 1. This is because the LBA range overlap between commands associated with Tag 3 and Tag 1 no longer occurs. At this instant, the LBA range of the command associated with Tag 3 overlaps only with the LBA range of the command associated with Tag 2. As the command associated with Tag 1 is completely processed, the completion table includes the commands associated with Tag 0 and Tag 1.

As depicted in FIG. 4d, as the command Tag 2 is completely processed, the overlap count of Tag 3 is decremented further by 1. The overlap count of Tag 3 at this instant is 0. This is because the LBA range overlap between commands associated with Tag 3 and Tag 2 no longer occurs. The LBA range of the command associated with Tag 3 no longer overlaps with the LBA range of any command. As the command associated with Tag 2 is completely processed, the completion table includes the commands associated with Tag 0, Tag 1, and Tag 2.

Figure 5:
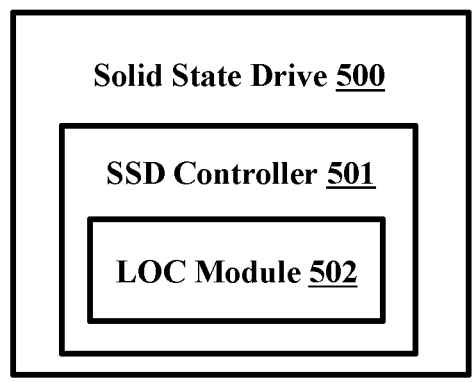
FIG. 5 depicts an LBA-Overlap Check (LOC) module in an SSD for managing LBA overlap scenarios, according to an exemplary embodiment of the inventive concept.

FIG. 5 depicts a LBA-Overlap Check (LOC) module block in an SSD for managing LBA overlap scenarios, according to an exemplary embodiment of the inventive concept. An LOC module 502 may be a part of a controller 501 in an SSD 500. The LOC module 502 may manage scenarios of overlap between LBA ranges of different commands in the controller 501. The LOC module 502 may enable seamless parallel execution of commands with LBA ranges not overlapping with the LBA ranges of other commands. The LOC module 502 may enable sequential execution of those commands whose LBA ranges overlap with LBA ranges of other commands. The order of execution of the commands is based on arrival of the commands at the LOC module 502 of the controller 501.

When an incoming command arrives in the controller 501, the LOC module 502 may detect whether there is an overlap between an LBA range of the incoming command and LBA ranges of other commands outstanding in the controller 501. The other commands outstanding in the controller may be referred to as outstanding commands. For example, a plurality of commands may have arrived at the controller 501 prior to the arrival of the incoming command and are outstanding in the controller 501. Based on the LBA range, each command in the controller 501 may correspond to an overlap count value.

The LOC module 502 may determine the overlap count value corresponding to the incoming command. The overlap count value indicates whether there is an overlap between the LBA range of the incoming command with LBA ranges of the plurality of commands that are outstanding in the controller 501. For example, if the overlap count value corresponding to the incoming command is 0, it may be inferred that the LBA range of the incoming command does not overlap with the LBA ranges of the plurality of outstanding commands. For example, if the overlap count value corresponding to the incoming command is 3, it may be inferred that the LBA range of the incoming command overlaps with the LBA ranges of three outstanding commands amongst the plurality of outstanding commands.

Referring back to FIG. 4a, the incoming command may be associated with Tag 3. The plurality of commands arriving prior to the incoming command may be associated with Tag 0, Tag 1, and Tag 2. As depicted in FIG. 4a, the LBA range of Tag 3 overlaps with LBA range of Tag 0, Tag 1, and Tag 2. Thus, the determined overlap count of Tag 3 is 3.

It may be noted that all commands arriving in the controller 501 may be associated with an overlap count parameter, which may be determined by the LOC module 502 when each of the commands arrives in the LOC module 502.

The LOC module 502 may determine the overlap count corresponding to the incoming command when the incoming command arrives at the LOC module 502 of the controller 501. The LOC module 502 may decrement the overlap count corresponding to the incoming command when each of the plurality of outstanding commands that overlap is completed.

The LOC module 502 allows execution of the incoming command when the overlap count corresponding to the incoming command is zero. The LOC module 502 allows parallel execution of commands whose LBA ranges do not overlap with the LBA range of other commands; while the commands whose LBA ranges overlap with the LBA ranges of other commands are sequentially executed.

FIG. 5 shows exemplary units of the SSD 500, but the inventive concept is not limited thereto. In exemplary embodiments of the inventive concept, the SSD 500 may include less or more units. Further, the labels or names of the units are only for illustrative purpose and do not limit the scope of the inventive concept. One or more units may be combined together to perform the same or a substantially similar function in the SSD 500.

Figure 6:
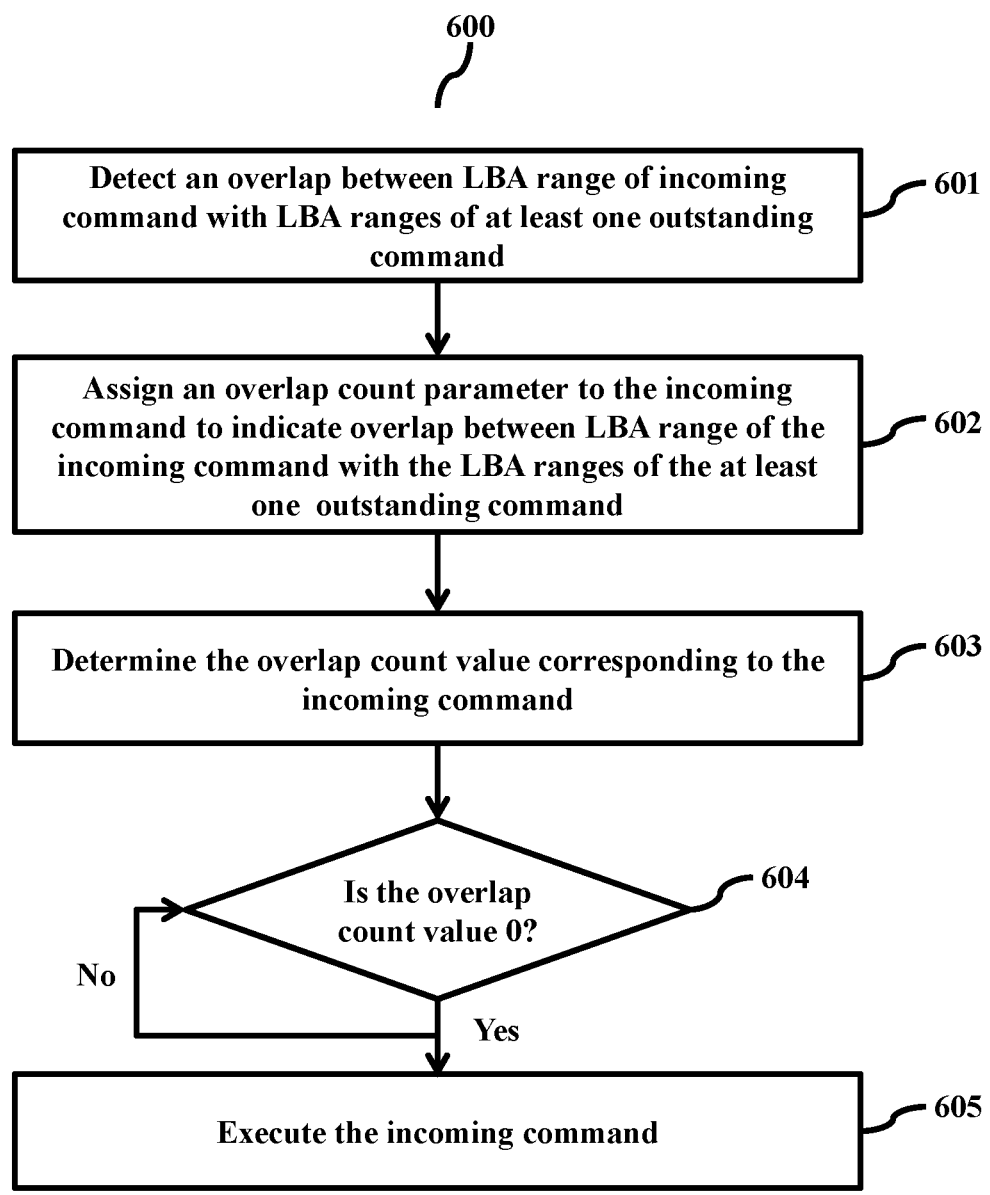
FIG. 6 is a flowchart depicting a method for managing occurrence of overlap between LBA ranges of commands in a controller of the SSD of FIG. 5, according to an exemplary embodiment of the inventive concept.

FIG. 6 is a flowchart depicting a method for managing occurrence of overlap between LBA ranges of commands in the controller of the SSD of FIG. 5, according to an exemplary embodiment of the inventive concept. In a method 600, at operation 601, the method 600 includes detecting an overlap between an LBA range of an incoming command and an LBA range of at least one outstanding command in the controller. The incoming command may be assumed to have arrived at the controller 501 after the arrival of the at least one outstanding command. As there is an occurrence of overlap between the LBA range of the at least one outstanding command and the LBA range of the incoming command, the method 600 executes the at least one outstanding command and the incoming command in a sequential order.

At operation 602, the method 600 includes assigning the incoming command with an overlap count parameter to indicate an overlap between the LBA range of the incoming command with the LBA range of the at least one outstanding command. It may be noted that the overlap count parameter is assigned to all commands in the controller 501 by the LOC module 502 of the controller 501.

At operation 603, the method 600 includes determining the overlap count value corresponding to the incoming command. For the sake of simplicity, only the overlap count value corresponding to the incoming command is considered. However, the method 600 includes determining the overlap count values of all commands in the controller 501.

The overlap count value corresponding to the incoming command indicates whether the LBA range of the incoming command overlaps with the LBA range of the at least one outstanding command, which has arrived prior to the incoming command. The overlap count value of the incoming command may be decremented if the at least one outstanding command is completely processed.

In an example, consider that the LBA range associated with the incoming command overlaps with the LBA ranges associated with three outstanding commands. The overlap count value corresponding to the incoming command in this case will be 3. When one of the three outstanding commands is completely processed, the overlap count value corresponding to the incoming command is decremented to 2. Similarly, when all of the three outstanding commands have been completely processed, the overlap count value is decremented to 0.

At operation 604, the method 600 includes determining whether the overlap count value corresponding to the incoming command is 0. If it is determined that the overlap count value is 0, the method 600 includes, at operation 605, executing the incoming command. If it is determined that the overlap count value is non-zero, the method 600 includes performing operation 604 again.

It may be noted that the commands in the controller 501 with LBA ranges not overlapping with the LBA range of any other command may be executed in parallel.

The various actions in the method 600 may be performed in the order presented, in a different order, or simultaneously. Further, in exemplary embodiments of the inventive concept, some operations listed in FIG. 6 may be omitted.

The exemplary embodiments of the inventive concept disclosed herein may be implemented through at least one software program running on at least one hardware device and performing management functions to control storage elements. The elements shown in FIG. 5 include blocks which may be at least one of a hardware device (e.g., a circuit), or a combination of hardware device and software module.

The exemplary embodiments of the inventive concept disclosed herein describe methods and systems for managing LBA overlap checking in an NVMe based SSD. Therefore, it is to be understood that the scope of protection is extended to a program and to a computer readable storage means having a message therein, such computer readable storage means containing program code for implementation of one or more operations of the method, when the program runs on a server, desktop, or any suitable programmable device. The method may be implemented through or together with a software program written in, e.g., Very High Speed Integrated Circuit Hardware Description Language (VHDL) or another programming language, or implemented by one or more VHDL or several software modules being executed on at least one hardware device. The at least one hardware device may be any kind of portable device that may be programmed. The device may also include hardware means, such as an Application-specific Integrated Circuit (ASIC), or a combination of hardware and software means, such as an ASIC, at least one microprocessor, and at least one memory with software modules located therein. The methods described herein may be implemented partly in hardware and partly in software. Alternatively, the inventive concept may be implemented on different hardware devices, e.g., using a plurality of CPUs.

Accordingly, exemplary embodiments of the inventive concept provide methods and systems for managing LBA overlap checking in a bare metal multi core PCIe based NVMe SSD, thus enabling seamless execution of commands whose LBA ranges do not overlap with the LBA ranges of outstanding commands. The commands whose LBA ranges overlap with the LBA ranges of the outstanding commands in the SSD may be executed sequentially. An overlap between an LBA range of an incoming command and the LBA ranges of outstanding commands may be determined when the incoming command arrives at a controller of an SSD. An overlap count of instances where the LBA range of the incoming command overlaps with the LBA ranges of the outstanding commands, which had arrived prior to the incoming command, may be maintained. The overlap count may be decremented when the outstanding commands are completely processed by the SSD. The incoming command may be executed when the overlap count is zero.

While the inventive concept has been shown and described with reference to exemplary embodiments thereof, it will be understood by those of ordinary skill in the art that various changes in form and details may be made thereto without departing from the spirit and scope of the inventive concept as set forth in the following claims.

We claim:

1. A method for managing Logical Block Address (LBA) range overlap checking in a Non-Volatile Memory express (NVMe) based Solid State Drive (SSD), the method comprising:
   detecting, by an LBA-Overlap Check (LOC) module, an overlap between an LBA range of an incoming command with an LBA range of at least one outstanding command in an SSD controller;
   determining, by the LOC module, an overlap count value corresponding to the incoming command, wherein the overlap count value indicates occurrence of an overlap between the LBA range of the incoming command and the LBA range of the at least one outstanding command;
   adjusting, by the LOC module, the overlap count value corresponding to the incoming command when the at least one outstanding command is processed: and
   executing, by the SSD controller, the incoming command when the adjusted overlap count value corresponding to the incoming command is equal to a predetermined value.

2. The method of claim 1, wherein the at least one outstanding command arrives at the SSD controller prior to the incoming command.

3. The method of claim 1, wherein the adjusting comprises:
   decrementing, by the LOC module, the overlap count value corresponding to the incoming command when the at least one outstanding command is processed,
   wherein the incoming command is executed when the overlap count value corresponding to the incoming command is zero.

4. The method of claim 1, wherein determining the overlap count value comprises:
   determining a number of outstanding commands having LBA ranges that overlap with the LBA range of the incoming command; and
   assigning the overlap count value corresponding to the incoming command as equal to the number of outstanding commands.

5. A Non-Volatile Memory express (NVMe) based Solid State Drive (SSD) capable of managing Logical Block Address (LBA) range overlap checking, wherein the NVMe based SSD is configured to:

detect, by an LBA-Overlap Check (LOC) module, an overlap between an LBA range of an incoming command with an LBA range of at least one outstanding command in an SSD controller;

determine, by the LOC module, an overlap count value corresponding to the incoming command, wherein the overlap count value indicates a number of outstanding commands with LBA ranges that occurrence of an overlap with the LBA range of the incoming command; and execute, by the SSD controller, the incoming command based on the overlap count value corresponding to the incoming command.

6. The NVMe based SSD of claim 5, wherein the at least one outstanding command arrives at the SSD controller prior to the incoming command.

7. The NVMe based SSD of claim 5, wherein the LOC module is configured to decrement the overlap count value corresponding to the incoming command when the at least one outstanding command is processed, and wherein the incoming command is executed when the overlap count value corresponding to the incoming command is zero.

8. The NVMe based SSD of claim 5, wherein the overlap count value is determined by:

determining, by the LOC module, the number of outstanding commands with LBA ranges that overlap with the LBA range of the incoming command; and assigning, by the LOC module, the overlap count value corresponding to the incoming command as equal to the number of outstanding commands.

9. A method for managing Logical Block Address (LBA) range overlap checking in a Non-Volatile Memory express (NVMe) based Solid State Drive (SSD), the method comprising:

detecting, by an LBA-Overlap Check (LOC) module, an overlap between an LBA range of an incoming command with an LBA range of at least one outstanding command in an SSD controller;

determining, by the LOC module, an overlap count value corresponding to the incoming command, wherein the overlap count value indicates occurrence of an overlap between the LBA range of the incoming command and the LBA range of the at least one outstanding command;

decrementing, by the LOC module, the overlap count value corresponding to the incoming command when the at least one outstanding command is processed; and executing, by the SSD controller, the incoming command based on the overlap count value corresponding to the incoming command being zero.

* * * * *